W. E. SAWYER.
Automatic Electric Telegraph.
No. 165,620.            Patented July 13, 1875.
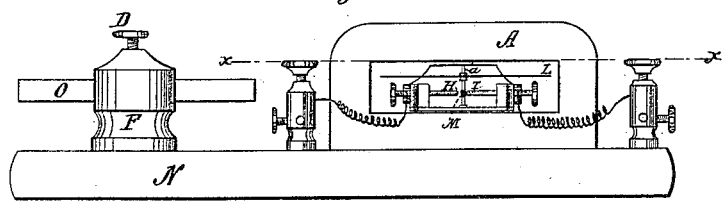
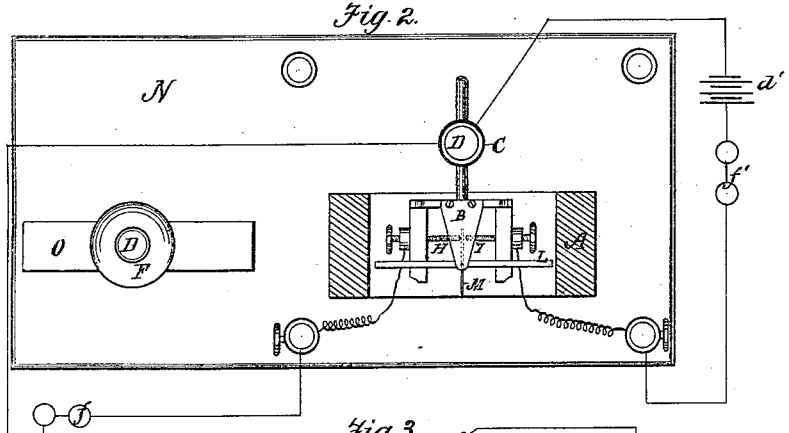
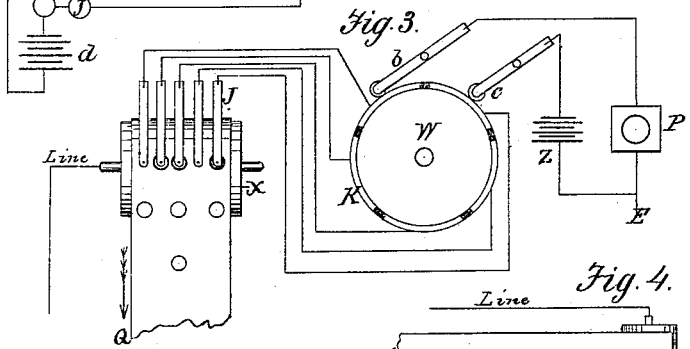
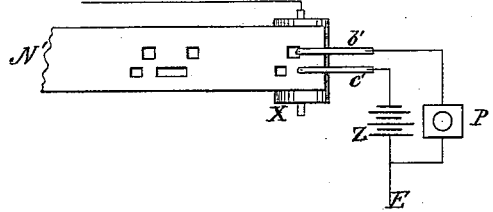
WITNESSES:
W. W. Hollingsworth
Solon C. Kemon
INVENTOR:
Wm E. Sawyer
BY
ATTORNEYS.
N. PETERS, PHOTO-LITHOGRAPHER, WASHINGTON, D. C.

UNITED STATES PATENT OFFICE.

WILLIAM E. SAWYER, OF WASHINGTON, DISTRICT OF COLUMBIA.

IMPROVEMENT IN AUTOMATIC ELECTRIC TELEGRAPHS.

Specification forming part of Letters Patent No. 165,620, dated July 13, 1875; application filed February 2, 1875.

*To all whom it may concern:*

Be it known that I, WILLIAM E. SAWYER, of Washington city, in the District of Columbia, have invented new and useful Improvements in Automatic or Chemical Telegraphs; and I do hereby declare that the following is a full, clear, and exact description of the same, reference being had to the accompanying drawings forming part of this specification.

My present invention relates so closely to my automatic-telegraph patent, application for which was filed November 10, 1874, that I have deemed it advisable to make reference to it in this specification. In carrying it out I transmit a battery-current to produce the chemical discoloration necessary to recording a signal, and follow it by an induced current, in order to clear the line of tailings. In that invention I employ an induction-coil, operated by a local battery. In my present invention I employ an induced current for the same purpose, but I produce and transmit the current in a different manner. I produce what may or may not be a continuous induced current of one polarity by any of the well-known devices of induction-coils or magneto-electric machines, and I throw these induced currents into the line after every battery-current.

The advantage of an induced current over a battery-current for the purpose of clearing a line of tailings, is that the induced current is of less duration than a battery-current—in other words, does not attenuate as much as a battery-current, while having the same or greater initial force, and does not neutralize by overlapping, so to speak, the marking current, as is the case with a neutralizing battery-current. And I also transmit an induced current for marking, clearing the line also by an induced current, by employing two styles contact points, brushes, or rollers falling through perforations, or making contact with metallic pieces upon a commutator-wheel, or otherwise making contacts, one of which contact-points throws into the line the marking-current, the other throwing into the line the clearing-current. Or I may use an induced current for marking, and follow it by a battery-current, the effect of which, however, would not be so good as by reversing the process; what I desire to cover being the combination of induced and battery currents, or battery and induced currents, in the manner, as to generation of the said currents and the methods of application, herein shown and described.

I am aware that reversed currents for line-clearing purposes have long been employed, so that at the present day the question of their use is limited to the methods of generation and application of the same.

In my present invention it is decidedly preferable to employ induced currents of one polarity only, and that the generation of these induced currents be continuous. I therefore employ for their generation any of the well-known forms of magneto-electric or induction-coil apparatuses for generating currents of one polarity, and I employ them in ways apparent in my automatic-telegraph patent hereinbefore mentioned, and also my patent No. 159,460, dated February 2, 1875, relating more particularly to autographic telegraphy.

It is quite necessary to chemical telegraphs that relays or signaling instruments shall be employed which shall have a slight resistance and give little or no inductive effects, which want I have endeavored to meet in two ways, herein shown and described. I also show new methods of perforation of transmitting-paper.

Having thus generally described my invention, and in order to enable those skilled in the art to make and use my improvements, I will describe the same more in detail, reference being to the accompanying drawings, in which—

Figure 1 is a general view of my relay or signaling instrument; Fig. 2, a sectional view of the same. Fig. 3 is a view of one method of applying my invention, and Fig. 4 another method of application. Fig. 5 shows the induction apparatus in a shunt.

Like letters indicate similar parts in all of the figures.

Referring to Fig. 1, N is any suitable base. A is a helix; L, a polarized needle; M, a contact-bar fixed to the pivot $a$ by wire-needle L in frame B, which slides through standard C. O is a polarized bar in standard F. DD are set-screws. H and I are contact-points insulated from each other, against which bar M plays.

In Fig. 2 are shown the local connections. d d' are local batteries; f f', sounder-magnets. When the end of the bar M is brought by the deflection of the needle L into contact with the point I, a local circuit is established through pivot a, bar M, point I, and magnet f', in which flows the battery d', by which a distinct sound is produced. When the opposite end of the bar M is in contact with point H, the magnet f is operated in like manner by battery d, so that, no matter what polarity of current be upon the line, one of the magnets will give the right signal. The polarized bar O acts as a spring upon the needle, causing it to return to zero as soon as the current is off the line, when neither point H or I will be in contact with the bar M, and consequently no signal will be made. The needle thus arranged will operate with great rapidity, and owing to its sensitiveness but slight resistance is needed in the helix or galvanometer coil. The bar M may be placed at right angles with the needle, and be somewhat removed from the needle. The contacts may be made by a point touching or dipping into quicksilver.

By making the bar M short, and the needle of the same length, comparatively great leverage is obtained at the points of contact. The slight inductive effects produced by this form of relay render it peculiarly serviceable in chemical telegraphs.

In Fig. 3 is how the method of application of my invention to my commutating transmitting apparatus, fully described in Letters Patent 158,442, dated January 5, 1875, to which I refer for details of construction, &c. Q is the transmitting-paper, perforated in lines of dots or dashes running crosswise of the strip, sheet or roll of paper, as shown in Letters Patent referred to, and which moves in the direction of the arrow over the metallic drum X. J are metallic contact-pieces, which fall through the perforations, and thereby make connection with drum X. Each one of these pieces is connected, by any suitable means, with a metallic piece, K, upon the periphery of an insulating disk, W, *seriatim*. The disk W is rapidly revolved, when the two contact-rollers b and c, bearing upon the disk, successively make contact with the pieces K, and transmit the impulses through the perforations over the line.

To the roller c is connected one pole of the battery Z, the other pole passing to earth E, while to the roller b is connected the magneto-electric or induction apparatus P, of opposite polarity to the transmitting-battery Z.

Now, it is apparent that, as the disk revolves, one of the pieces K will come first under roller c, thus transmitting the battery-current, if at the instant of contact the drum X be electrically connected with that piece over the line; the piece K next coming in contact with roller b, which throws the induced current from P into the line, thus clearing the line of tailings. A resistance may be placed between the roller b and earth E.

In Fig. 4 I indicate a method of applying my invention to ordinary automatic-telegraph apparatus, N' being the perforated paper; X, the transmitting-drum; Z, the battery; P, the induction apparatus; b' and c' the contact-points, brushes, or rollers which fall through the perforations in the paper. In this, the lower row of perforations serve to transmit the battery-currents, and the upper row the induced or clearing currents.

In the transmitting apparatus I have not deemed it necessary to show more than the metallic drums and contact-points, as both the nature and construction of automatic machines are well known and will be readily understood. Nor in magneto-electric or induction apparatus have I deemed it necessary to indicate anything more than the application of the same, as almost any of the well-known machines for producing magneto-electric or induced currents of one polarity may be applied to the operation of my telegraph.

I may mention, as proceeding in the same line of telegraphs, that I have employed the following method of transmission: Induced currents of each polarity, positive and negative, alternately and with great rapidity, are set up by magneto electric or induction-coil apparatus, and these are thrown into the line by a single contact point, brush, or roller, a single perforation answering for a dot, and a longer perforation for a dash, instead of employing a local circuit, operated by a stylus, falling through the perforations to set up the induced currents.

I may extend the use of the steady induced currents, set forth in the foregoing specification, to a shunt or local circuit at the receiving instrument. In this case the induced current is merely local, and causes discoloration of the receiving paper whenever the transmitting-battery is removed from the line; the discoloration ceasing so soon as the transmitting-battery is upon the line, as the transmitting-battery current and the local induced current are in opposite polarity when to the recording style.

What I claim as new, and desire to secure by Letters Patent, is—

1. In a polarized-needle telegraph-relay, the combination of a polarized needle and a projecting contact-piece operating with the needle, with a sliding-bar magnet to act upon the polarized needle in the place of a spring, substantially as shown and described.

2. The combination of a line, transmitting-battery and metallic contact-point, brush, or roller therefor, with a magneto-electric or induction-coil apparatus which throws into the line a current of one polarity and metallic contact-point, brush, or roller therefor, substantially as shown and described.

3. The combination, in an automatic or chemical telegraph, with a transmitting apparatus, of a galvanic battery so arranged that galvanic currents of one polarity will be thrown into the line, and a magneto-electric or induction apparatus so arranged as to throw into the line induced currents of opposite polarity to the galvanic-battery currents, as and for the purposes specified.

WM. E. SAWYER.

Witnesses:
CHAS. A. PETTIT,
SOLON C. KEMON.